(12) United States Patent
Vass et al.

(10) Patent No.: US 11,593,414 B2
(45) Date of Patent: Feb. 28, 2023

(54) CONFIGURING DEVICES OF A BUILDING AUTOMATION SYSTEM

(71) Applicant: Honeywell International Inc., Morris Plains, NJ (US)

(72) Inventors: Jiri Vass, Prague (CZ); Henrik Dibowski, Leipzig (CZ); Petr Endel, Prague (CZ); Jiri Rojicek, Prague (CZ); Liana Maria Kiff, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 808 days.

(21) Appl. No.: 16/245,149

(22) Filed: Jan. 10, 2019

(65) Prior Publication Data

US 2020/0225623 A1    Jul. 16, 2020

(51) Int. Cl.
*G06F 16/00* (2019.01)
*G06F 16/332* (2019.01)
*G06F 16/33* (2019.01)

(52) U.S. Cl.
CPC ...... *G06F 16/3329* (2019.01); *G06F 16/3334* (2019.01); *G06F 16/3344* (2019.01)

(58) Field of Classification Search
CPC ............. G06F 16/3329; G06F 16/3334; G06F 16/3344

USPC ......................................................... 707/794
See application file for complete search history.

(56) References Cited

U.S. PATENT DOCUMENTS

| | | | |
|---|---|---|---|
| 6,029,092 A * | 2/2000 | Stein | H02J 3/14 700/291 |
| 2004/0054789 A1* | 3/2004 | Breh | H04L 67/02 709/229 |
| 2012/0012662 A1* | 1/2012 | Leen | F24F 11/58 236/51 |
| 2014/0032555 A1 | 1/2014 | Kiff et al. | |
| 2015/0323918 A1* | 11/2015 | Nair | G05B 15/02 700/275 |
| 2016/0337144 A1* | 11/2016 | Kim | H04L 12/2816 |
| 2016/0337289 A1* | 11/2016 | Duca | H04L 51/38 |
| 2017/0308045 A1 | 10/2017 | Dibowski et al. | |

FOREIGN PATENT DOCUMENTS

| | | | | |
|---|---|---|---|---|
| EP | 3235182 A1 * | 10/2017 | | H04L 12/2834 |
| EP | 3235182 A1 | 10/2017 | | |
| EP | 3680732 A2 * | 7/2020 | | G05B 15/02 |

* cited by examiner

*Primary Examiner* — Monica M Pyo
(74) *Attorney, Agent, or Firm* — Seager, Tufte & Wickhem LLP

(57) ABSTRACT

An approach and system incorporating obtaining a semantic model for a device, identifying properties from the semantic model, processing the properties, obtaining a property role, identifying a property role filter that correlates to the property role, and generating parameter values associated with the property role filter.

19 Claims, 8 Drawing Sheets

| Admin Portal | | |
|---|---|---|
| ☰ | | |
| 📄 CONTEXT DISCOVERY | ID2988BA0BA-4B90-4E09-B3BA-533A1ADAFDD4 > Chilled Water Plant | |
| | | 300 ↙ |
| | | REGROUP AS ⌄  [CONFIRM]  ☒ |
| | Identify Assets ⌄ | All Confirmed (0) and unconfirmed (9) assets |
| | Air Conditioner(3/23) | |
| | Air Curtain(0/0) | Search list of assets |
| | Air Handling Unit(1/1) | |
| | Boiler(0/0) | ☐  Name ⌃ | Status ⇅ ▽ | Role |
| | Calorifier(0/0) | ☑ › CH1(15) | Unconfirmed | |
| | Ceiling Suspended Unit(0/0) | ☑ › CH2(20) | Unconfirmed | |
| | Chilled Beam System(0/0) | ☑ › CH3(16) | Unconfirmed | |
| | Chilled Water Plant(0/9) | ☐ › C0(13) | Unconfirmed | |
| | Chiller(0/1) | ☐ › GREMCC(4) | Unconfirmed | |
| | Combined Heat and Power Plant(0/0) | ☐ › GRWMCC(4) | Unconfirmed | |
| | Compressed Air System(0/0) | ☐ › L1(57) | Unconfirmed | |
| | Condenser(0/0) | ☑ › TenCWP1(3) | Unconfirmed | |
| | Cooling Tower(0/3) | ☑ › TenCWP2(3) | Unconfirmed | |
| | CrackUnit(0/0) | | |
| | Electric Meter(0/0) | | |
| | All Points (2414) | | |
| | Point Role Mapping | | |
| | Relationship Mapping | | |
| Terms & Conditions   Privacy Statement | | |

FIG. 3

Admin Portal

CONTEXT DISCOVERY

500

Identify Assets >

All Points(2414)

Point Role Mapping

Relationship Mapping

ID2988BA0BA-4B90-4E09-B3BA-533A1ADAFDD4 > Roles

| Search roles ✕ ▽ | ASSIGN ROLE | UNASSIGN | SELECT A DIFFERENT ROLE ✓ |

SupplyAirFanEnergy(0,10)

SupplyAirFanSpeedCommand(0,10)

SupplyAirFanStatus(0,38)

SupplyAirTemperature(0,51)

SupplyAirTemperatureSetpoint(0,31)

VFD Energy(0,1)

VFD Power(0,0)

VFDStatus(0,0)

Zone Cooling Temperature Setpoint(0,0)

Zone Heating Temperature Setpoint(0,0)

Zone Humidity(0,4)

Zone Humidity Setpoint(0,1)

Unmapped Points(105)

Search by point name

| | Point Name ◇ | Confidence ◇ |
|---|---|---|
| ☐ | AC1EC_CigCallPV | 0.6934999999999999 |
| ☐ | AC1EC_SaTempHtgSpPV | 0.959571648 |
| ☐ | AC1NP_SaSPSpLoLmPV | 0.7481345791999999 |
| ☐ | FVAV119TermLdPV | 0.8475999999999999 |
| ☑ | AC1SP_SaTempPV | 0.7816194943999999 |
| ☐ | AC1EC_SaSPSpHaltPV | 0.7467478591999999 |
| ☐ | FVAV109RmTempSpPV | 0.881006464 |
| ☐ | AC1EC_SaPresPV | 0.7650075199999999 |
| ☐ | FVAV120TermLdPV | 0.7096 |
| ☐ | FVAV120RmTempSpPV | 0.881006464 |
| ☐ | AC1NP_SaSPSpHaitPV | 0.9381345792 |
| ☐ | AC1EC_MDOpStHPV | 0.6811999999999999 |
| ☑ | AC1NP_SaTempPV | 0.9716194944 |
| ☐ | AC1NP_SaSPinDelayPV | 0.9095196479999998 |
| ☐ | AC1SP_SaSPSpHLimPV | 0.7481345791999999 |
| ☐ | AC1SP_SaFittDPPV | 0.926619648 |

Terms & Conditions   Privacy Statement

FIG. 5

CONFIGURING DEVICES OF A BUILDING AUTOMATION SYSTEM

TECHNICAL FIELD

The disclosure relates generally to building automation systems, and more particularly to configuring devices of a building automation system.

BACKGROUND

Building automation systems are complex and comprise up to tens of thousands of points (datapoints) of sensors, controllers, actuators, and so forth. Analytics, such as for example, predictive maintenance models and fault detection rules, process the time series data of such datapoints to diagnose or predict faults, optimize the equipment performance, and so on. Given the large number of systems maintained over several millions of buildings and many analytics that need to constantly run, the process of configuring the analytics should be automated by computers in order to be faster and less expensive. A key enabler for automatically-enabled analytics is the semantic models. Semantic models describe the arrangement of real-world objects and the context of those systems. They are defined with a common vocabulary and established by a formal domain model. What would be desirable is an approach of producing semantic models for devices of a building automation system that could be used to obtain properties of the devices that are then filtered such that analytics can be configured and implemented on the devices such as, for example, advanced diagnostics, energy management solutions, equipment performance optimization, and so on.

SUMMARY

In an example of the disclosure, an approach and system may incorporate obtaining a semantic model for a device, identifying a set of properties from the semantic model, processing the set of properties, obtaining a property role from the processed set of properties, identifying a property role filter that correlates to the property role, and generating a set of parameter values associated with the property role filter.

Alternatively or additionally to the foregoing, processing the set of properties may include identifying a set of predefined tags and assigning the set of predefined tags to at least one property from the set of properties to produce the property role.

Alternatively or additionally to any of the embodiments above, the method may further comprise accessing a set of context discovery algorithms, obtaining a set of device information for the device, processing the set of context discovery algorithms using the set of device information, obtaining a set of clues from the processed set of context discovery algorithms, and processing the set of clues to obtain the semantic model for the device.

Alternatively or additionally to any of the embodiments above, processing the set of clues may include determining a confidence value for at least one clue from the set of clues to identify a type of the device.

Alternatively or additionally to any of the embodiments above, processing the set of clues may include identifying a first point role for at least one clue from the set of clues and eliminating candidates that have a point role that does not match the first point role.

Alternatively or additionally to any of the embodiments above, the method may further comprise determining a confidence value for each of the candidates that are not eliminated and selecting a candidate from the candidates that has a highest confidence value.

Alternatively or additionally to any of the embodiments above, identifying the set of properties from the semantic model may include accessing a semantic model service.

In another example of the disclosure, a system may comprise a device and a controller configuration to obtain a semantic model for the device, identify a set of properties from the semantic model, process the set of properties, obtain a property role from the processed set of properties, identify a property role filter that correlates to the property role, and generate a set of parameter values associated with the property role filter.

Alternatively or additionally to any of the embodiments above, processing the set of properties may include identifying a set of predefined tags and assigning the set of predefined tags to at least one property from the set of properties to produce the property role.

Alternatively or additionally to any of the embodiments above, the controller may be further configured to access a set of context discovery algorithms, obtain a set of device information for the device, process the set of context discovery algorithms using the set of device information, obtain a set of clues from the processed set of context discovery algorithms, and process the set of clues to obtain the semantic model of the device.

Alternatively or additionally to any of the embodiments above, processing the set of clues may include determining a confidence value for at least one clue from the set of clues to identify a type of the device.

Alternatively or additionally to any of the embodiments above, processing the set of clues may include identifying a first point role for at least one clue from the set of clues and eliminating candidates that have a point role that does not match the first point role.

Alternatively or additionally to any of the embodiments above, the controller may be further configured to determine a confidence value for each of the candidates that are not eliminated and select a candidate from the candidates that has a highest confidence value.

Alternatively or additionally to any of the embodiments above, identifying the set of properties from the semantic model may include accessing a semantic model service.

In another example of the disclosure, a controller for creating a semantic model for a device of a building automation system may be configured to access a set of context discovery algorithms, obtain a set of device information for the device, process the set of context discovery algorithms using the set of device information, obtain a set of clues from the processed set of context discovery algorithms, process the set of clues, and generate the semantic model for the device based on the processed set of clues.

Alternatively or additionally to any of the embodiments above, the controller may be further configured to identify a set of properties from the semantic model, process the set of properties, obtain a property role from the processed set of properties, identify a property role filter that correlates to the property role, and generate a set of parameter values associated with the property role filter.

Alternatively or additionally to any of the embodiments above, processing the set of properties may include identifying a set of predefined tags and assigning the set of predefined tags to at least one property from the set of properties to produce the property role.

Alternatively or additionally to any of the embodiments above, processing the set of clues may include determining a confidence value for at least one clue from the set of clues to identify a type of the device.

Alternatively or additionally to any of the embodiments above, processing the set of clues may include identifying a first point role for at least one clue from the set of clues and eliminating candidates that have a point role that does not match the first point role.

Alternatively or additionally to any of the embodiments above, the controller may be further configured to determine a confidence value for each of the candidates that are not eliminated and select a candidate from the candidates that has a highest confidence value.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE DRAWING

The disclosure may be more completely understood in consideration of the following description in connection with the accompanying drawings, in which:

FIG. 3 is an example of a user interface implementation of a device type assignment in a Context Discovery Tool;

FIG. 5 is an example of a user interface implementation of a point role assignment in the Context Discovery Tool;

Figure 1:
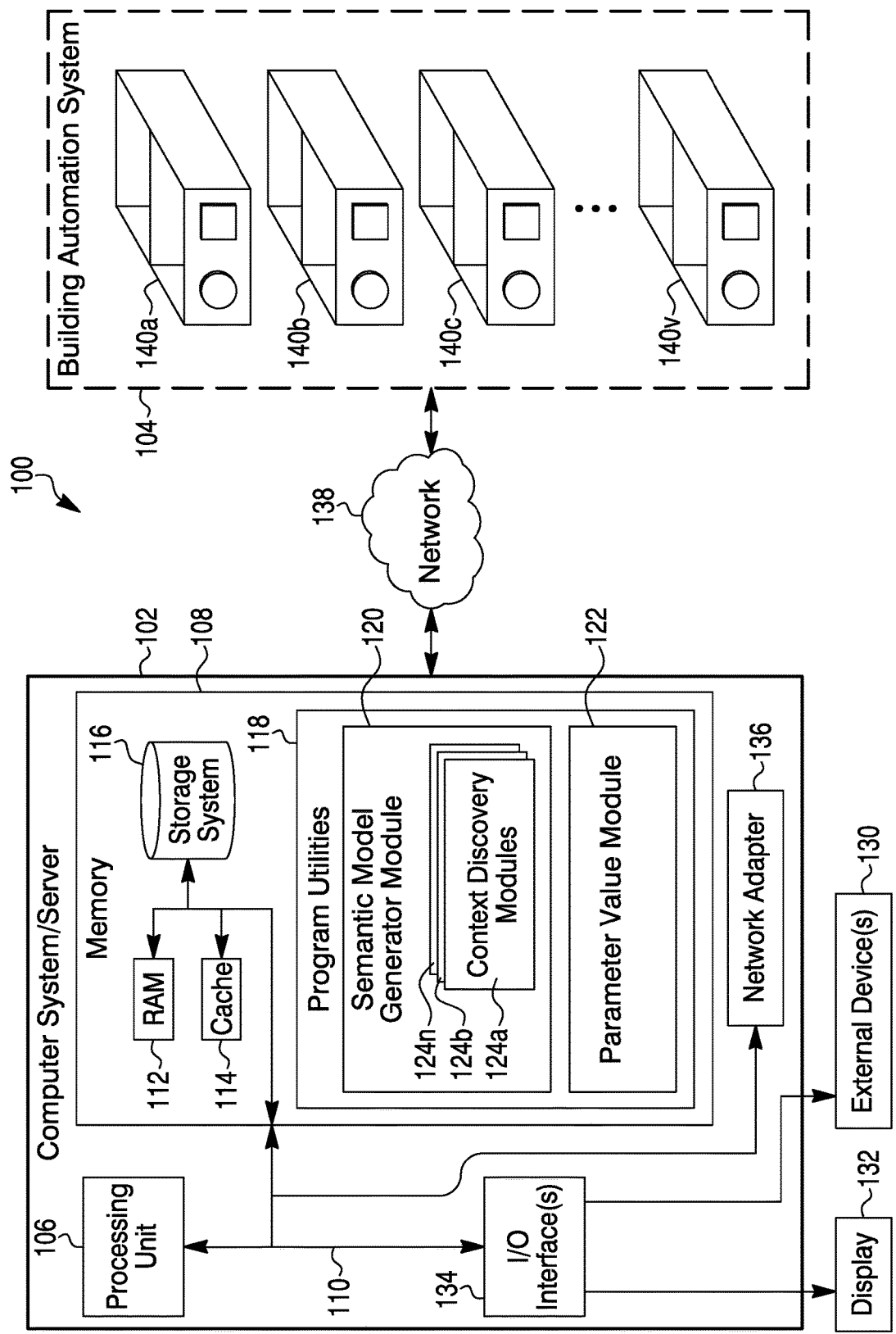
FIG. 1 is a schematic block diagram of an illustrative system for creating semantic models for devices of a building automation system and identifying property role filters and parameter values for the devices.

While the disclosure is amenable to various modifications and alternative forms, specifics thereof have been shown by way of example in the drawings and are described. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", and so on, indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used in connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

Certain embodiments of the present disclosure may be found in a controller, system, a method, and/or a non-transitory computer-readable storage medium with an executable program stored thereon. In various embodiments, a semantic model for a device may be obtained and a set of properties from the semantic model may be identified. The set of properties may be processed and property roles may be obtained from the processed set of properties. Property role filters that correlate to the property roles may then be identified and a set of parameter values associated with the property role filters may be generated.

FIG. 1 is a schematic block diagram of an illustrative system 100 for creating semantic models for devices of a building automation system (BAS) 104 and identifying property role filters and parameter values for the devices. Semantic models may be used to allow for the analysis of devices or performing analytics and customized manual programming for devices such as, for example, advanced diagnostics, energy management solutions, optimizing equipment performance, and so forth. In some instances, semantic models may enable analysis services without human intervention. In some cases, semantic models describe the arrangement of real-world systems, devices, and/or components and provide the context of those systems. In some cases, they may be defined with a common vocabulary and established by a formal domain model such as, for example, a domain ontology. In some instances, the manual creation of semantic models (e.g., by humans) may be slow and expensive. As such, in some examples, the illustrative system 100 may be capable of automatically deriving semantic models using automated context discovery for devices of the BAS 104.

In certain embodiments, the system 100 may include a computer system/server 102 and the BAS 104. As shown, the BAS 104 may include a plurality of building control devices 140A-140V. The building control devices 140A-140V are exemplary endpoint devices that provide a building control function. Each of the building control devices 140A-140V may include suitable logic, circuitry and/or code for storing one or more points or "properties" associated with the operation of the building control device. In some cases, the computer system/server 102 may search and filter the properties of the BAS 104 or devices of the BAS 104 which are of interest for analytics. In some instances, the computer system/server 102 may use "property role filters", as a mechanism for defining requirements towards properties, or classes of properties. The computer system/server 102 may then find matching properties for each property role filter. The property role filters may be reusable across applications and simplify the development of analytics, which may have a high-demand for flexibility, extensibility, and adjustments. In some examples, the property filters may also be valuable as a means for efficiently storing algorithm parameters.

In some cases, the building control devices 140A-140V may be an exemplary representation of any BAS that may include, but is not limited to, a security system, a Heating, Ventilation and/or Air Conditioning (HVAC) system, a lighting and/or low voltage system, a water management system, an entertainment system, a communication system, and/or any other suitable BAS. In some cases, the BAS 104 may be managed or controlled using a controller (not shown in FIG. 1) that is operatively connected to building control devices 140A-140V. In some examples, the controller may be the computer system/server 102 as shown in FIG. 1, but this is not required. In some cases, the controller may be operatively connected to the building control devices 140A-140V through a wired or wireless network 138. For example, in some embodiments, the building control devices 140A-140V may include lighting or appliance devices and the controller may communicate with the lighting/appliance devices through serial and/or parallel communication. In some cases, the lighting/appliance devices may include, but are not limited to, outlets, lighting, drapes, and general load switching, some of which are subject to "dimming" control which varies the amount of power provided to the various building control devices. Alternatively, or in addition, the building control devices 140A-140V may include environmental devices and the controller may communicate with the environmental devices through serial and/or parallel communication. The environmental devices may include, but are not limited to, one or more HVAC control devices (e.g., Variable-Air-Volume (VAV) units, dampers, valves, fans, heating units, cooling units, sensors, thermostats, humidifiers, dehumidifiers, and so forth), which allow for the monitoring and/or control of temperature and/or other environmental conditions in the building. Alternatively, or in addition, the building control devices 140A-140V may include security and/or fire devices and the controller may communicate with the security and/or fire devices through serial and/or parallel communication. The security and/or fire devices may include, for example, smoke/heat sensors, electronic gates, electronic locks, contact sensors for monitoring the state of doors and windows, security card pass systems, and so on. Alternatively, or in addition, the building control devices 140A-140V may include a variety of low voltage devices, and the controller may communicate with the low voltage devices through serial and/or parallel communication. In some cases, the low voltage devices may include, but are not limited to, garage doors, lawn sprinklers, exterior lights, and pool/spa heaters (via a relay or the like). These are just example building control devices.

According to certain embodiments, the BAS 104 and the computer system/server 102 may utilize a network 138 to communicate. In some examples, the network 138 may be a local area network (LAN), a general wide area network (WAN), and/or a public network (e.g., the Internet). Furthermore, in some cases, the network 138 may comprise copper transmission cables, optical transmission fibers, wireless transmission, routers, firewalls, switches, gateway computers and/or edge servers. In certain instances, a network adapter is included in the computer system/server 102 (e.g., the network adapter 136) and/or a network adapter (not shown) is included with each device 140A-140V to support communication. In some cases, the BAS 104 includes the computer system/server 102.

As shown in FIG. 1, the computer system/server 102 may be in the form of a general-purpose computing system, but this is not required. In some cases, the computer system/server 102 may be special purpose computing system. The components of computer system/server 102 may include, but are not limited to, one or more processors or processing units 106, a system memory 108, and a bus 110 that couples various system components including system memory 108 to the processor 106. When provided, the bus 110 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 may include a variety of computer system readable media. Such media may be any available media that are accessible by computer system/server 102, and it may include volatile memory, non-volatile memory, removable and non-removable media.

The system memory 108 can include computer system readable media in the form of volatile memory, such as random access memory (RAM) 112 and/or cache memory 114. Computer system/server 102 may further include other removable/non-removable, volatile/non-volatile computer system storage media. By way of example only, storage system 116 can be provided for reading from and writing to non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each can be connected to the bus 110 by one or more data media interfaces. As will be further depicted and described below, the memory 108 may include program modules, which when executed, may be configured to carry out the functions for creating semantic models for devices of the BAS 104.

Program utilities 118 may be stored in the memory 108 and may include a set of application program modules (e.g., software), such as a semantic model generator module 120 and a parameter value module 122. In some cases, the program utilities 118 may include additional program modules as well as an operating system, one or more other application program modules, and program data. According to various embodiments, the application program modules (e.g., the semantic model generator module 120) may include context discovery modules 124a-124n, for example. In some cases, the context discovery modules 124a-124n may provide the necessary algorithms for the semantic model generator module 120 to automatically create semantic models from available information from the building automation system 104 and/or from memory 108. In some cases, the semantic model generator module 120 may apply several of the different context discovery modules 124a-

124*n* to discover the context of a specific device or system. In some instances, the context discovery modules may include machine learning, deep learning, tokenization of names and string/substring matching, clustering, and so on, that, if necessary, may be executed in parallel and on different computers such that each context discovery module can discover certain pieces of context of the device. In some cases, the computer system/server 102 may have access to or the BAS may provide information about the device such as, for example, names of assets, names of properties (datapoints), raw data of properties (time-series data), and correlations between entities, that the context discovery modules 124*a*-124*n* may use to discover "clues" about the device. The semantic module generator module 120 may then collect the clues and merge them using a probabilistic approach which may increase a confidence of the clues that are reported from several of the context discovery modules 124*a*-124*n*. In this way, the combination of several of the different context discovery modules 124*a*-124*n* may produce clues that are more complete and have a higher likelihood to be correct (e.g., confidence) than by applying one specialized context discovery module/algorithm.

In some cases, the semantic model generator module 120 may use the clues to determine different parts of a semantic model for the device. For instance, the semantic model generator module 120 may determine the type of the device (e.g., Boiler, Chiller, Air Handling Unit, Variable Air Volume, and so forth), the semantics of a property, (i.e., the role a property plays in the system), and the relationship between two entities (e.g., asset, property, pointrole, and so forth). In some instances, a user (e.g., system integrators, energy analysts, and so on) may interact with the computer system/server 102 to confirm or cancel either individual clue or make the final decision of the type of the device, the semantics of a property or relationships between entities. In some cases, the semantic model generator module 120 may assist the user in making their decisions. For example, in some cases, the semantic model generator module 120 may provide a ranked list of most likely matches based on the clues discovered by the context discovery modules 124*a*-124*n*. This ranked list/information may allow the semantic models for devices to be properly assembled. The semantic models may then potentially be used for analyzing the devices or performing analytics and customized manual programming for devices such as, for example, energy analysis, fault diagnostics, and so on.

As stated above, another (i.e., more general) term for a point may be a "property". Besides datapoints, a property can also be a static property of a building, system, device, asset, or entity. For instance, a property may include the volume of a room or the capacity or vendor of a device. In some instances, the parameter value module may use semantic tagging (e.g., by assigning predefined tags to the property) to define the semantics of properties in a machine-interpretable way. The tags may be categorized into multiple tag categories, which may be orthogonal to each other (i.e., they each define a different dimension of the meaning of a property). The semantic model generator module 120 may then combine the tags of a property to express the semantics as a "property role".

In certain embodiments, the semantic model generator module 120, including the context discovery modules 124*a*-124*n*, and the parameter value module 122 may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The semantic model generator module 120 and the parameter value module 122 may execute entirely on a user's computer or device, partly on the user's computer or device, as a stand-alone software package, partly on the user's computer or device and partly on a remote computer or entirely on a remote computer or server. In the latter scenario, the remote computer or server may be connected to the user's computer or device through any type of network, including a local area network (LAN) or a wide area network (WAN), or the connection may be made to an external computer (for example, through the Internet using an Internet Service Provider).

In various embodiments, the computer system/server 102 may communicate with one or more external devices 130 such as a keyboard, a pointing device, a display 132, and so forth. The one or more external devices 130 and the display 132 may enable a user to interact with the computer system/server 102, and/or may enable the computer system/server 102 to communicate with one or more other computing devices. In some cases, as discussed above, the semantic model generator module 120 may provide the ranked list of most likely matches to the user on the display 132 and the user may confirm or cancel clues and/or make final decisions using the one or more external devices 130. Such communication can occur via Input/Output (I/O) interfaces 134. In addition, the computer system/server 102 may communicate with one or more networks (e.g., network 138) via the network adapter 136. As depicted, the network adapter 136 may communicate with the other components of the computer system/server 102 via the bus 110. In some cases, the computer system/server 102 may include other hardware and/or software components. Examples may include, but are not limited to: microcode, device drivers, redundant processing units, external disk drive arrays, RAID systems, tape drives, data archival storage systems, and so on.

Figure 2:
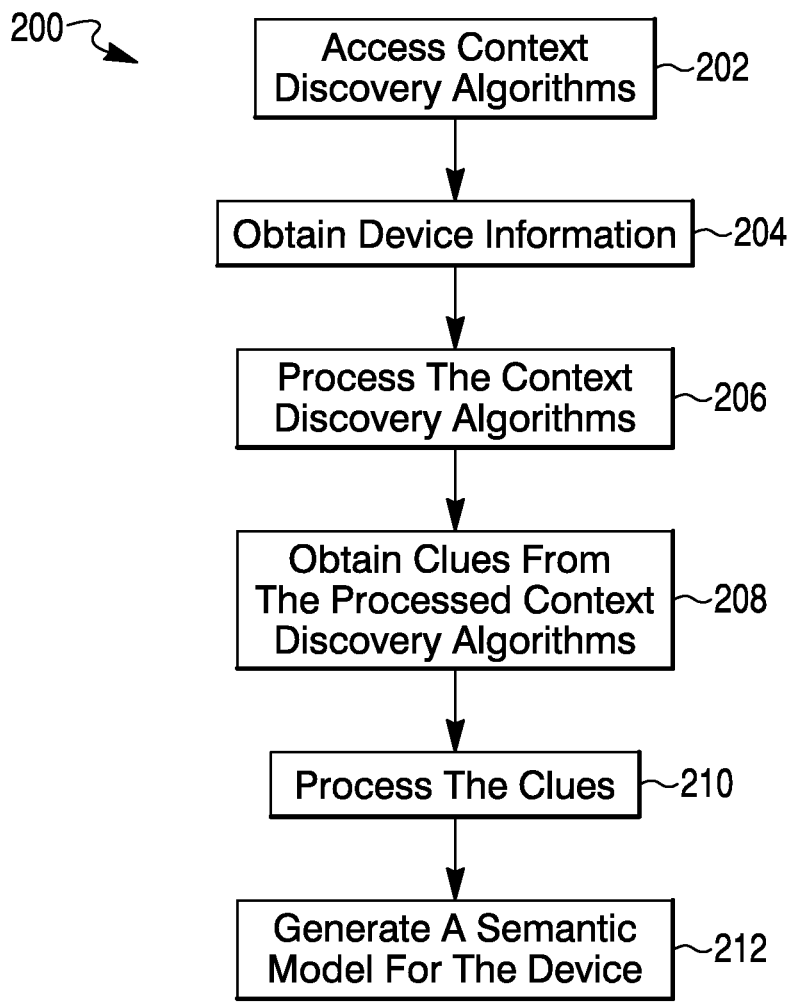
FIG. 2 is an illustrative method.

FIG. 2 is a flow diagram of an illustrative method 200. FIG. 2 will be described in conjunction with FIG. 3, FIG. 4, and FIG. 5. FIG. 2 depicts an illustrative method for creating semantic models for a device of a BAS. The method 200 begins at step 202 where context discovery algorithms are accessed. In some examples, the context discovery algorithms may include, but are not limited to, machine learning algorithms, deep learning algorithms, tokenization of names and string/substring matching algorithms, and clustering algorithms. At step 204, device information for the device may be obtained. In some examples, different types of available machine-processable information for the device may be obtained. For instance, the name of the device, the names of properties, and raw data of the properties (e.g., time-series data) may be obtained. In some cases, the information for the device may be inputs for the context discovery algorithms and at step 206, the context discovery algorithms are processed using the information or pieces of the information. In some examples, the context discovery algorithms may be processed in parallel and on different computers. As a result of their processing, the context discovery algorithms may return clues, which may represent findings about the device. At step 208, the clues are obtained from the processed context discovery algorithms. In some examples, the clues may be stored in a common repository ("clues repository") such as, for example, a database (e.g., RDBMS or RDF Triple Store). In some cases, the clues from all context discovery algorithms may be represented and stored in a unified format. For instance, a common vocabulary may be established using a formal domain model (e.g., domain ontology). As such, the clues may refer to the same domain concepts with the same underlying semantics.

At step 210, the clues may be processed. In some cases, a clue may be a mapping of a real world entity (e.g., device, asset, property, and so forth) represented by its name or ID, to a conceptual entity of the formal domain model (class or instance), which a processed context algorithm identifies as a likely meaning of the real world entity. The clue may then be processed to determine a confidence value, which may represent a likelihood that this identified meaning is correct. For example, a clue for a device may be [device→device type (class)]. For instance, ["AHU1"→"AirHandlingUnit"]. Furthermore, a confidence value for the clue may be normalized to fall within the interval (0,1) (e.g., 0.9). Accordingly, the higher the value, the higher the confidence. In another example, a clue for a property of the device and their corresponding confidence values may be [property→concept term and type (class or instance), confidence value]. For instance, ["RTU3RaFanEn"→"RooftopUnit" (ElementAssembly), 0.93], ["RTU3RaFanEn"→"ReturnAir" (DistributionLocation), 0.85], ["RTU3RaFanEn"→"Fan" (Element), 0.95], ["RTU3RaFanEn"→"Enabled" (ElementState), 0.7], ["RTU3RaFanEn"→"PresentValue" (ControlPointFunction), 0.4], and ["RTU3RaFanEn"→"BinaryState" (Measure), 0.4]. The clues representation may also be applicable and extensible for representing other types of information (e.g., relationships between devices and properties). The confidence values of the clues can be derived from tests with real data (e.g., statistics), or they can be predefined based on experience or calculated by some computations (e.g., heuristics).

In some cases, the common vocabulary for the clues may allow the clues to be merged from different context algorithms. Accordingly, in some examples, processing the clues may include the merging of equivalent clues and a special processing of confirmed clues (i.e., clues that have a confidence value of "1"). For example, clues may be considered as equivalent if both their real world entity and conceptual entity are the same. Their confidence values, however, can be different. For instance, equivalent clues may be ["AHU1"→"AirHandlingUnit", 0.9] and ["AHU1"→"AirHandlingUnit", 0.8]. As such, equivalent clues may be merged into one combined clue. The combined clue may have an increased confidence value, which may be calculated from the confidence values of the equivalent clues. For example, the confidence value for the combined clue may be calculated using the probabilistic formula:

combinedConfidenceValue=1−Π(1−confidenceValue$n$)N$n$

With N being the number of clues to be merged. As can be seen, combinedConfidenceValue can take values in the interval (0, 1). For instance, with confidence values of 0.6 and 0.8: combinedConfidenceValue=1−((1−0.6)*(1−0.8))=0.92. With confidence values of 0.3, 0.4, and 0.5: combinedConfidenceValue=1−((1−0.3)*(1−0.4)*(1−0.5))=0.79. With confidence values of 0.1, 0.1, 0.2, 0.2, and 0.3: combinedConfidenceValue=1−((1−0.1)*(1−0.1)*(1−0.2)*(1−0.2)*(1−0.3))=0.63712.

In some instances, clues may be confirmed by a user (e.g., system integrators, energy analysts, and so on) at any time during method 200. Once a clue gets confirmed, its confidence value is changed to a value of "1", which means that the clue is correct (i.e., it is a fact). Once a clue is confirmed, the special processing may be done. For devices, this may mean that all other clues for the same device can be deleted or disabled. For properties, this may mean that all the other clues for a property for the same concept type (e.g., ElementAssembly, DistributionLocation, Element, and so forth) can be deleted or disabled.

For device types, given the final set of all remaining device clues after the clues processing, a prioritized list of the most likely device types (e.g., Boiler, Chiller, Air Handling Unit, Variable Air Volume, and so on) can be derived for the device. In some cases, the device types may be listed in order according to their confidence value. A chart 300 in FIG. 3 depicts a particular example of a user interface implementation of the device type assignment in a Context Discovery Tool. The confidence value is not shown in FIG. 3; however, it could add further value if shown in a separate column. In some cases, for each device, or batches of devices, the device type with the highest confidence value can be chosen from that list automatically or a user can either confirm the device type or select a different device type from the ordered list of potential device types, along with their confidence.

For property semantics, given the final set of all remaining property clues after the clues processing, the clues for a property can be used to identify the semantics of the property (e.g., the role a property plays in the device). In the semantic model, this may be expressed by attaching a point role to a property. A point role may be a concept set such as a collection of strongly typed concept terms defined in the domain ontology (e.g., AirHandlingUnit, Temperature, and so on), which may be discrete elements of different concept types (e.g., PlantType, MeasureType, and so forth) that together, provide an unambiguous description of the context (semantics) of the property of the device. Point roles may contain one concept term per concept type, but may not have to specify all concept types. In some cases, the point roles for a particular domain may be defined in templates. In some instances, the templates may define the properties and the point roles that the particular device can have (e.g., expert domain knowledge).

In some cases, the determination of the best matching point role for a property may be done as a matching of the point clues of the property to the point roles defined in all the templates. If the device type is known already (i.e., confirmed), then the set of point roles can be reduced to the point roles of the corresponding template. In some cases, the matching may be a two-stage process. First, if there are confirmed clues amongst the clues for a property, then they may be applied to reduce the number of point role candidates. Given a confirmed point clue, all point roles can be eliminated from the candidate list that have a different concept term for the particular concept type defined. Point roles, however, which do not specify that concept type, may remain on the candidate list since point role definitions may not specify all concept types and may leave some of them open. For example, a point clue may include: ["RTU3RaFanEn"→"ReturnAir" (DistributionLocation), 1]. As such, all point roles can be sorted out or eliminated for the property that has a different concept term than "ReturnAir" to specify the DistributionLocation. However, all point roles that do not specify the DistributionLocation may remain in the candidate list.

Second, each of the remaining point roles in the candidate list may now be matched to the clues of the property. That is, for each point role, the intersection of its concept terms with the concept terms given by the set of clues of the point may be determined. The confidence values of the clues for the concept term in this intersecting set may be taken and used to calculate the confidence of the point role match. For example, the confidence value of the point role match may be calculated using the formula:

$$\text{pointroleMatchConfidence} = \Sigma \text{confidenceValue}n$$
$$Mm=1 \text{ noOfConceptTermsInPointrole}$$

With M being the number of concept terms in the intersecting set and thus, the confidence values and pointRoleMatchConfidence can take values in the interval (0, 1).

Figure 4:
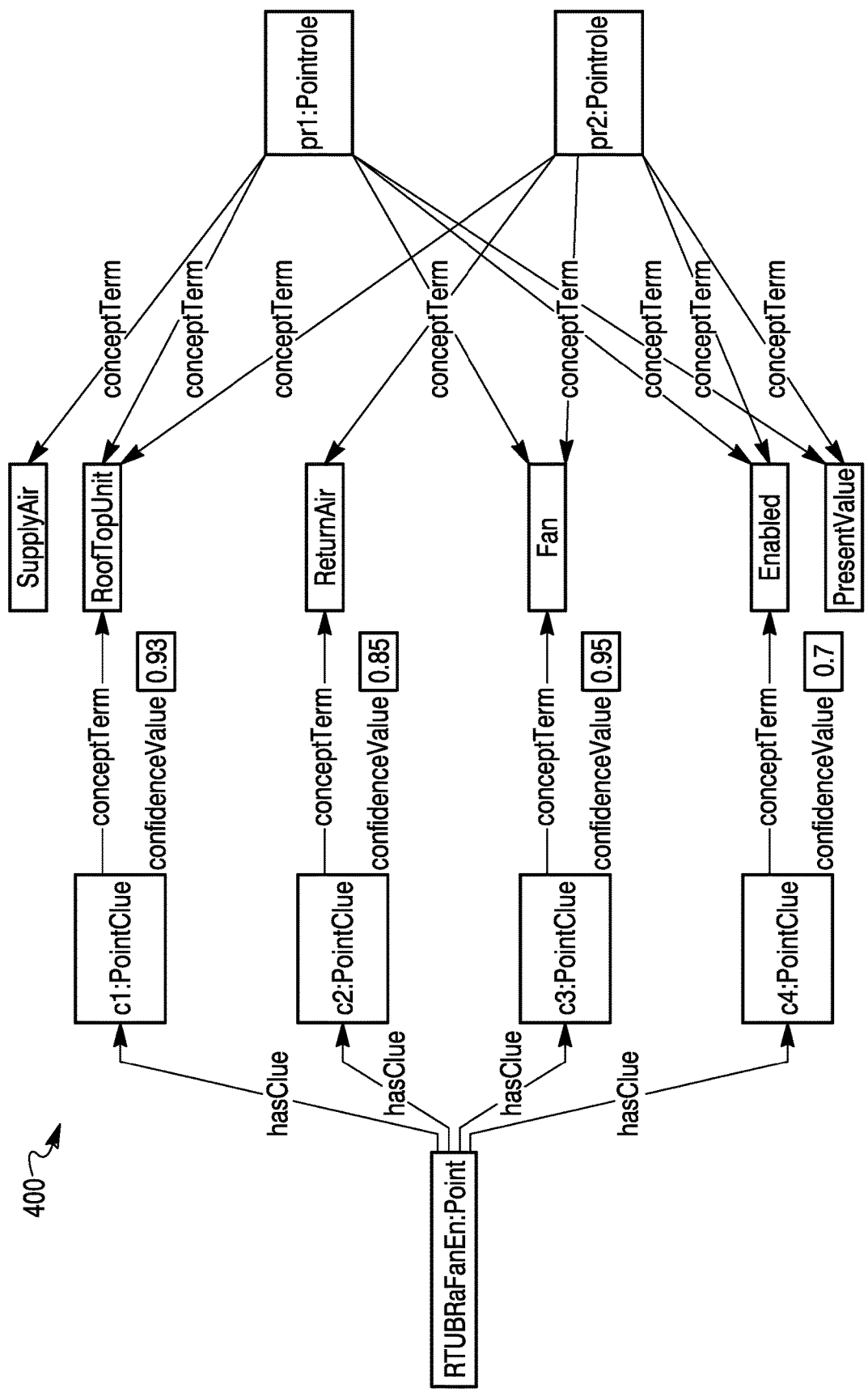
FIG. 4 is a point role matching example scenario.

Turning to FIG. 4, a point role matching example scenario 400 is depicted. As shown, four clues are provided for one property (i.e., four concept terms) and two point roles are provided with five concept terms each. In the example shown in FIG. 4, the confidence of the match of the property clues against the two point roles is computed in the following way:

Point role pr1: (0.93+0.95+0.7)/5=0.516

Point role pr2: (0.93+0.85+0.95+0.7)/5=0.686

In this scenario, Point role pr2 is the better match because the clues match four out of its five concept terms.

After the point role calculations, a prioritized list of the most likely or best matching point roles can be derived for each property by ordering the matching point roles according to their pointRoleMatchConfidence values. FIG. 5 depicts a particular example of a user interface implementation 500 of the point role assignment in the Context Discovery Tool. Point role mapping in the Context Discovery Tool may be automatically grouped to the most likely point roles. As can be seen, the confidence (i.e., pointRoleMatchConfidence) for each property is shown in the column "Confidence". For each property, or batches of properties, the point role with the highest confidence value may be chosen from the list automatically or a user can either confirm the point role or select a different point role from the ordered list of potential point role candidates, along with their confidence.

The clues representation, clues processing and following procedures are also extensible and applicable for representing and deriving other types of information, such as relationships between entities (e.g., devices, systems, properties, point roles), for example. Turning back to FIG. 2, at step 212, the determined facts (e.g., types of devices, point roles of properties, relationships between entities, and so on) may be obtained and assembled to generate or obtain a semantic model(s) for the device (e.g., ontology).

Figure 6:
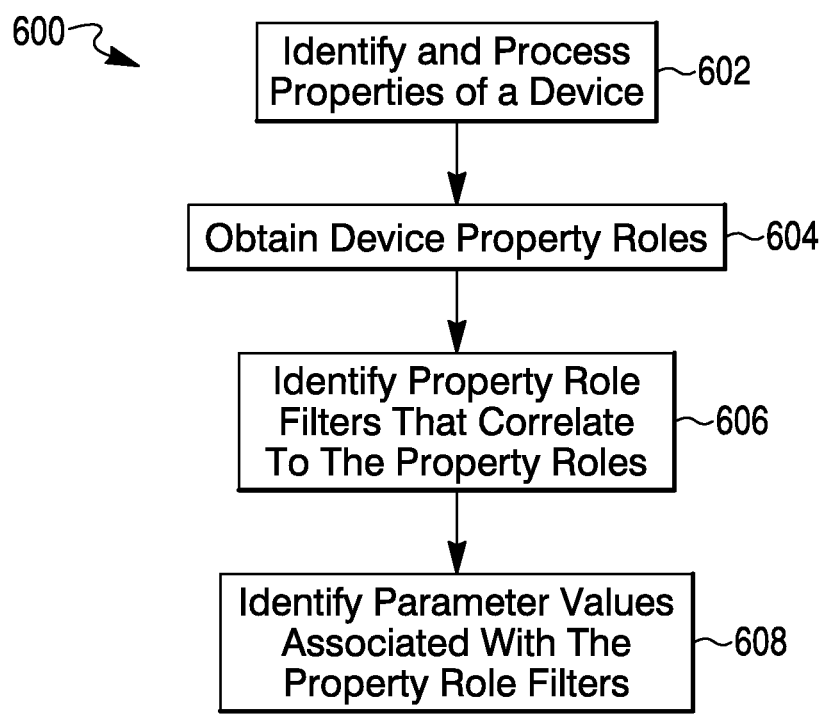
FIG. 6 is an illustrative method.

FIG. 6 is a flow diagram of an illustrative method 600. FIG. 6 will be described in conjunction with FIG. 7, FIG. 8, and FIG. 9. FIG. 6 depicts an illustrative method 600 for identifying property role filters and parameter values for a device of a BAS. The method 600 begins at step 602 where properties of the device are identified and processed. In some examples, a semantic model service may be accessed to identify some or all of the properties of the device. In some cases, the semantic model service can be implemented and exposed to applications as a standalone RESTful web service or as part of an IoT middleware. In some instances, the semantic model service may allow for effective, efficient, and secure querying and retrieving of contextual information about a system (e.g., building automation system, factory automation system, process automation system, smart grid, IoT, airport) from semantic models. In some cases, the semantic model service may support various kinds of underlying semantic models of various types of systems, various kinds of applications and their demands, and support different levels of access rights for different applications and users. In some examples, the semantic model service may store and allow semantic models to be accessed by applications (e.g., the parameter value module 122, from FIG. 1) via one or more generic query APIs. The query APIs may take as input the name of the predefined query, the dataset(s) (i.e., semantic system models) on which the query should be executed, the required query result format (e.g., JSON, XML, text), and optionally one or more query parameters. The latter may be required for queries that are capable of being parameterized, which may make the queries more reusable amongst various applications. For example, a non-parameterized query (i.e., getAllProperties) may return all properties (e.g., datapoints) that are defined in a dataset (e.g., site), along with their semantic description and another non-parameterized query (i.e., getNestedLocations) may return all spatial elements and their spatial containment relationships (e.g., spatial element A contains spatial element B). A parameterized query (i.e., getUpstreamEquipment) may return the upstream equipment that supplies a given device or location (e.g., parameter1) and another parameterized query (i.e., getEntityPropertiesByFilter) may return all properties of a given device (parameter 1) that are matches of one or more given property role filters (parameter 2). In some cases, the semantic model service may also support update queries. Update queries may be capable of changing the semantic models (e.g., add information, change information, delete information, and so on). They may also be available as predefined, parametrized update queries that can be called via a generic update query API.

Figure 7:
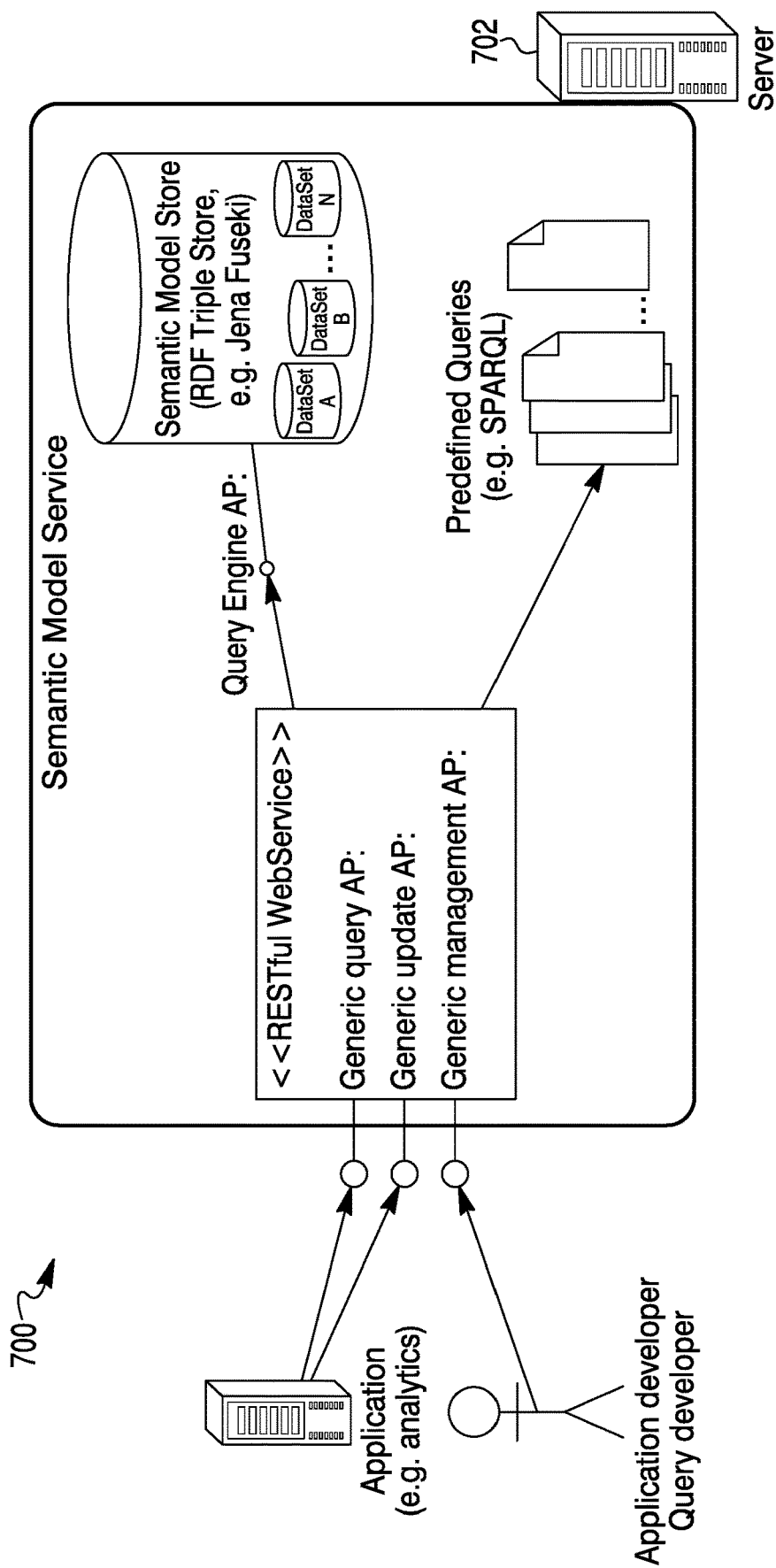
FIG. 7 is an example architecture of a semantic model service.

FIG. 7 depicts an example architecture 700 of the semantic model service. In this example, the service is a RESTful web service that runs on a server 702 (e.g., the computer system/server 102, from FIG. 1) and provides three APIs: a generic query API; a generic update API; and a query management API. In some cases, the semantic model service may be a Java EE programming language and the enterprise application is deployed as RESTful web service on an Apache Tomcat web server. However, this is not required and other programming languages and web servers may be used. In some cases, a standard ontology store can be used for storing and querying the semantic models (e.g., OWL/RDF ontologies). For instance, the RDF Triple Store "Apache Jena Fuseki" and its SPARQL query engine "Jena ARQ" may be used. However, other ontology stores could be used as well or graph databases (e.g., Neo4j). In some examples, the predefined queries may be stored inside the service. For example, the queries may be stored as individual files or within a database.

In some cases, the generic query API may be consumed by applications (e.g., the parameter value module 122, analytics, and so forth) and, as a result, may return the query results (e.g., device properties). The consuming applications may need to provide the name of the predefined query to run, the dataset(s) (i.e., semantic system models) on which the query should be executed, the required query result format (e.g., JSON, XML, text), and optionally, in case of parameterized queries, one or more query parameters. Internally, the particular query may be taken, parametrized, and executed by the ontology store on the semantic models that are contained in the particular dataset(s). The query results (e.g., the device properties) may be finally formatted in the requested format and returned to the calling application.

In some cases, the generic update API may be almost identical to the generic query API. The only difference may be that the queries are update queries, which can alter the contents of the semantic models. Higher user privileges may be required in order to use the generic update API.

In some cases, the query management API may be used for the management and maintenance of the predefined queries. In some examples, it may provide users (e.g., application developers) a list and description of all available queries. In such examples, the semantic model service can self-document its current functionality at each moment to all its users. Additionally, users with particular privileges ("query developers") may upload new predefined queries or change existing predefined queries. As such, the functionality of the semantic model service may be changed on the fly, without recoding, recompiling or recommissioning the service. As stated herein, the predefined queries may be stored inside the service, for example, as individual files (e.g., one file per query).

Figure 8:
FIG. 8 is an example table.

In some examples, once the properties are obtained, they may be processed by assigning tags to the properties. In some examples, the tags may define a different dimension of the meaning of the properties. In some instances, the tags may be predefined. In some cases, the tags may be categorized into multiple tag categories and may be orthogonal to one another. For instance, some tag categories may be domain- or application-specific, and particular applications might add their own tags to properties. Turning to FIG. 8, table 800 depicts example tag categories, such as "Measure", "Material, "Signal", "ControlPoint-Function", and "Limit" and the associated tags within this categories.

Figure 9:
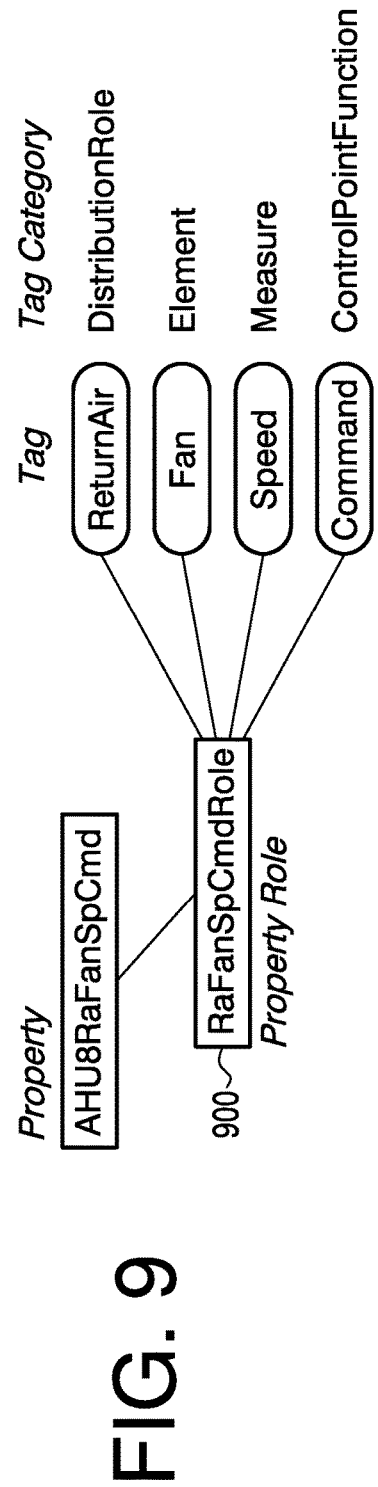
FIG. 9 is an example of a property role.

Turning back to FIG. 6, at step 604, device property roles are obtain. In some examples, the property roles may be obtained by combining the tags of a property. FIG. 9 depicts an example of a property role 900 that comprises multiple tags associated to specific tag categories. As shown, the air handling unit (AHU) device has the property "AHU8RaFanSpCmd" with the tags "ReturnAir", "Fan", "Speed", and "Command". The union of these tags produces the property role 900 of "RaFanSpCmdRole". In some cases, adding one or more tags of particular tag category (e.g., Limit) may change the meaning of a property role. For example, the additional tag "MaximumLimit" can change the meaning of a property from a sensor value to the maximum limit for a sensor value (i.e., the setpoint).

Turning back to FIG. 6, at step 606, property role filters that correlate to the property roles are identified. In some examples, property role filters may act as a mechanism for defining required properties or classes of properties. For instance, a property role filter may define: mandatory tags a property role must have; prohibited tags a property role must not have; and prohibited tag categories a property role must not use (i.e., must not use any of a particular tag category). For example, the property role filter OutsideAirTemperature may specify the following requirements: Mandatory tags: Air (Material), Temperature (Measure), PresentValue (ControlPointFunction), Analog (Signal), OutsideAir (DistributionLocation), Sensor (PhysicalControlElement); Prohibited tags: Controlled Variable (ControlPointFunctionSubtype); and Prohibited tag categories or category: Limit. In some cases, the property role filters may be matched to property roles. That is, the property roles may be selected that are valid matches of the requirements defined by the property role filters. For instance, valid matches of a property role filter may include the property roles that have all mandatory tags assigned, have none of the prohibited tags assigned, and have no tags from the prohibited tag categories assigned. In some cases, the property role matching may be implemented as queries on an ontology graph, a graph database, or a relational database. However, this is not required. In some cases, the property roles and the property role filters may have an M-to-N relationship. That is, a property role can be matched by several property role filters and a property role filter can match several property roles. From all matching property role filters of a property role, the property role filter that matches the largest number of mandatory tags may be the best matching property role filter. As such, the best matching property role filter may be the most detailed filter matching the property role. Accordingly, in some cases, the best matching property role filter (i.e., the most detailed property role filter) may be identified as the property role filter that correlates to the property role. The method for determining the best matching property role filters can be used to implement analytics and applications in a more flexible, generic way. For each required property, the analytics can define a set of alternative property role filters, ranging from rather abstract requirements (e.g., AnyAirTemperature, AnyOutsideAirTemperature, and so on) to very detailed requirements (e.g., SolarShieldOutsideAirTemperature). Accordingly, the properties that match the best matching property role filters may be the properties that are selected to implement analytics. For instance, if there is a solar shield outside air temperature property, then that property may be chosen. Otherwise the property/properties matched by the second most detailed property role filter may be chosen.

At step 608, parameter values associated with the property role filters are identified. In some cases, the property role filters may have a set of predefined parameter values used for parameterizing the analytics or application. When a property role filter is selected as the winning filter (i.e., the best matching property role filter), then its associated parameter values may be used for configuring the corresponding parameters. In that way, the parameter values of the more specific property role filters can override the parameter values of the less specific property role filters. This mechanism may enable a definition of different parameterizations for different types of properties to be used by the analytics. By using the less specific property role filters first, general parameter values can be defined for broader classes of properties. In some cases, by using more detailed property role filters, the general parameter values may then be overridden by other parameter values for more specific properties. For instance, a data validation analytics algorithm (OutOfRangeTooLow) may detect illegal property values that are below a minimum value (i.e., out of range). The property role filter "AnyOutsideAirTemperature" may imply that the parameter "MinimumValue" should be set to −20 degree Celsius. The property role filter "SolarShieldOutsideAirTemperature" may imply that the parameter "MinimumValue" should be set to −15 degree Celsius. In this case, the more specific property role filter SolarShieldOutsideAirTemperature overrides the more general parameterization of −20 degree Celsius for any outside air temperature property by the value of −15 degree Celsius for solar shield outside air temperature properties.

Property role filters may allow for implementing more powerful and flexible algorithms and rules since a number of properties can be selected by using one or a few property role filters and different parameterizations can be specified by using the principle of overriding. This may simplify the implementation and make algorithms or rules more powerful. The algorithms or rules may be easier to specify and may be more manageable since a small number of them may be required to validate thousands of properties having possibly hundreds of different property roles. Moreover, straightforward rules may be formulated (e.g., "If AnyZoneAirTemperature<2° C., then validity is OutfRangeTooLow"). This may accelerate the development and configuration of analytics and concurrently, lower costs. Additionally, the resulting algorithms may be reused for other systems.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method of optimizing control of building automation system, the method comprising:
    obtaining a semantic model for a device of the building automation system;
    identifying a set of properties of the device from the semantic model;
    processing the set of properties;
    obtaining a property role from the processed set of properties, the property role having a set of tags based on the set of properties;
    identifying a property role filter that matches the property role by determining the set of tags of the property role include each of the following: all mandatory tags defined by the property role filter, does not include any of the prohibited tags defined by the property role filter, and does not include any tags from prohibited tag categories defined by the property role filter;
    generating a set of parameter values for the set of properties, wherein the set of parameter values is associated with the property role filter identified; and
    controlling the device based on the set of parameter values.

2. The method of claim 1, wherein processing the set of properties includes:
    identifying a set of predefined tags; and
    assigning the set of predefined tags to at least one property from the set of properties to produce the property role, the set of tags includes the set of predefined tags.

3. The method of claim 1, further comprising:
    accessing a set of context discovery algorithms;
    obtaining a set of device information for the device;
    processing the set of context discovery algorithms using the set of device information;
    obtaining a set of clues from the processed set of context discovery algorithms; and
    processing the set of clues to obtain the semantic model for the device.

4. The method of claim 3, wherein processing the set of clues includes determining a confidence value for at least one clue from the set of clues to identify a type of the device.

5. The method of claim 3, wherein processing the set of clues includes identifying a first point role for at least one clue from the set of clues and eliminating candidates that have a point role that does not match the first point role.

6. The method of claim 5, further comprising:
    determining a confidence value for each of the candidates that are not eliminated; and
    selecting a candidate from the candidates that has a highest confidence value.

7. The method of claim 1, wherein identifying the set of properties from the semantic model includes accessing a semantic model service.

8. A system of optimizing control of a building automation system, comprising:
    a device of the building automation system; and
    a controller configured to:
        obtain a semantic model for the device;
        identify a set of properties of the device from the semantic model;
        obtain a property role from the set of properties, the property role having a set of tags based on the set of properties;
        identify a property role filter that is a valid match of the property role by determining the set of tag of the property role include each of the following: all mandatory tags defined by the property role filter, no prohibited tags defined by the property role filter, an no tags from prohibited tag categories defined by the property role filter;
        generate a set of parameter values for the set of properties, wherein the set of parameter values is associated with the property role filter identified; and
        control the device based on the set of parameter values.

9. The system of claim 8, wherein processing the set of properties includes:
    identifying a set of predefined tags; and
    assigning the set of predefined tags to at least one property from the set of properties to produce the property role.

10. The system of claim 8, the controller further configured to:
    access a set of context discovery algorithms;
    obtain a set of device information for the device;
    process the set of context discovery algorithms using the set of device information;

obtain a set of clues from the processed set of context discovery algorithms; and process the set of clues to obtain the semantic model of the device.

11. The system of claim 10, wherein processing the set of clues includes determining a confidence value for at least one clue from the set of clues to identify a type of the device.

12. The system of claim 10, wherein processing the set of clues includes identifying a first point role for at least one clue from the set of clues and eliminating candidates that have a point role that does not match the first point role.

13. The system of claim 12, the controller further configured to:

determine a confidence value for each of the candidates that are not eliminated; and select a candidate from the candidates that has a highest confidence value.

14. The system of claim 8, wherein identifying the set of properties from the semantic model includes accessing a semantic model service.

15. A controller for creating a semantic model for a device of a building automation system, the controller configured to:

access a set of context discovery algorithms;

obtain a set of device information for the device;

process the set of context discovery algorithms using the set of device information;

obtain a set of clues from the processed set of context discovery algorithms;

process the set of clues;

generate the semantic model for the device based on the processed set of clues;

obtain a property role for the device based on a set of properties from the semantic model;

identify one or more property role filters that have tag requirements matching a set of tags of the property role;

identify a property role filter of the one or more property role filters that match the property role by determining the set of tags of the property role includes each of the following: all mandatory tags defined by the property role filter, none of the prohibited tags defined by the property role filter, and no tags from prohibited tag categories defined by the property role filter; and control the device based on parameter values associated with the property role filter identified.

16. The controller of claim 15, wherein processing the set of properties includes:

identifying a set of predefined tags; and assigning the set of predefined tags to at least one property from the set of properties to produce the property role, the set of tags includes the set of predefined tags.

17. The controller of claim 15, wherein processing the set of clues includes determining a confidence value for at least one clue from the set of clues to identify a type of the device.

18. The controller of claim 15, wherein processing the set of clues includes identifying a first point role for at least one clue from the set of clues and eliminating candidates that have a point role that does not match the first point role.

19. The controller of claim 18, further configured to:

determine a confidence value for each of the candidates that are not eliminated; and select a candidate from the candidates that has a highest confidence value.

* * * * *